April 23, 1935. V. G. APPLE 1,998,917
VEHICLE BRAKE MECHANISM
Filed April 8, 1929 2 Sheets-Sheet 1
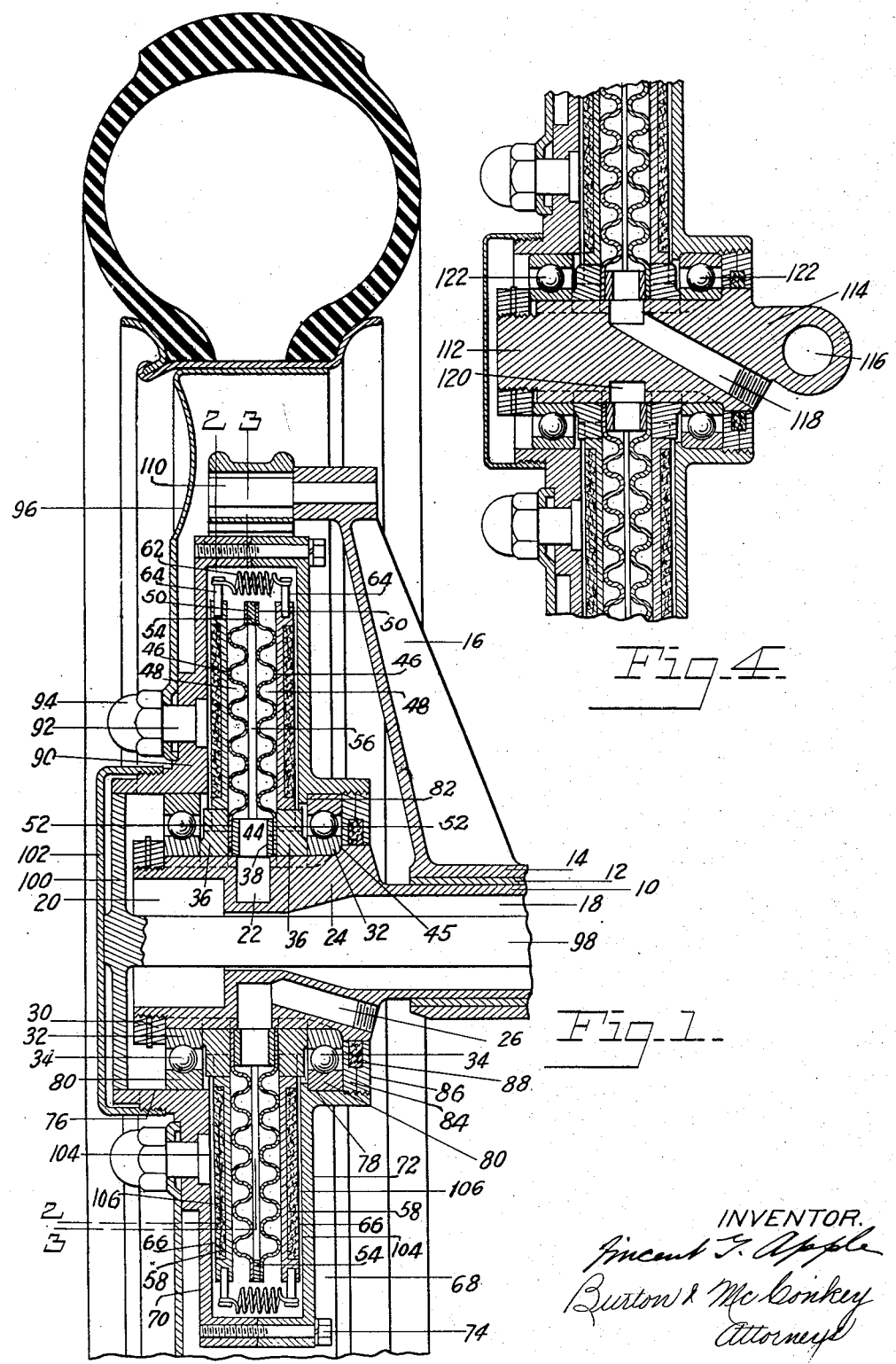

April 23, 1935.　　　　V. G. APPLE　　　　1,998,917
VEHICLE BRAKE MECHANISM
Filed April 8, 1929　　　2 Sheets-Sheet 2
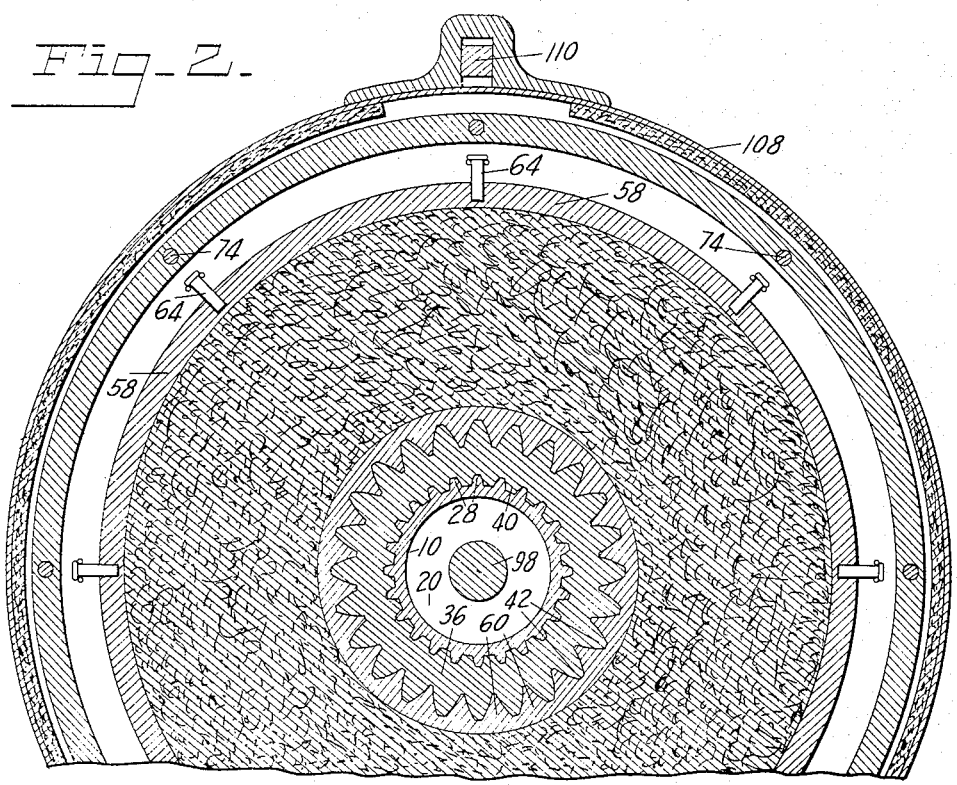
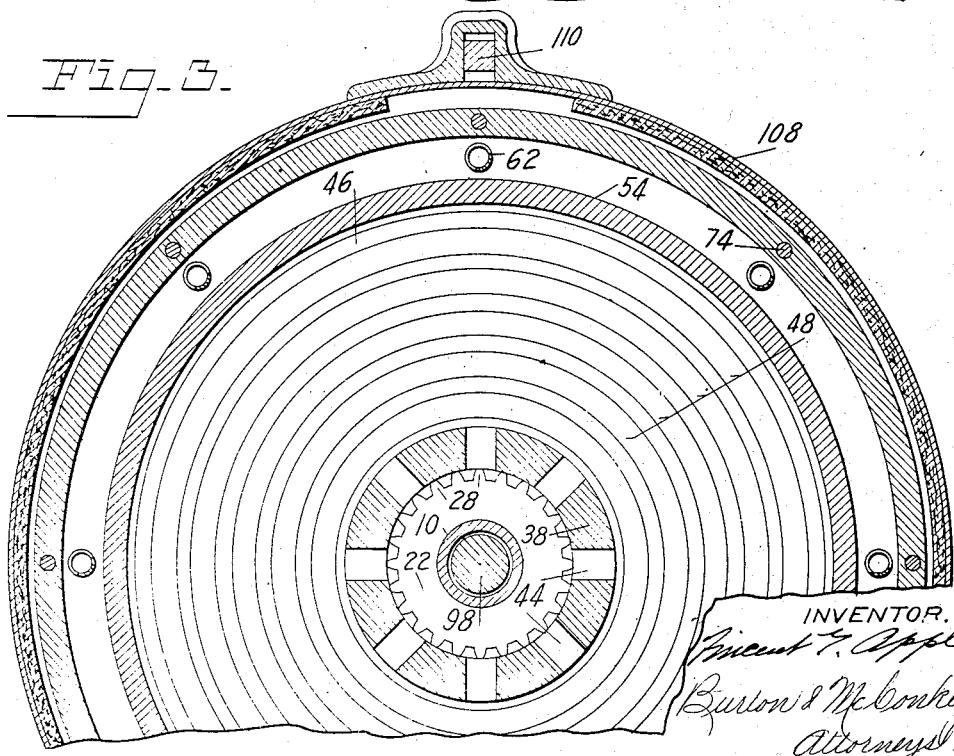

Patented Apr. 23, 1935

1,998,917

UNITED STATES PATENT OFFICE 1,998,917

VEHICLE BRAKE MECHANISM

Vincent G. Apple, Dayton, Ohio, assignor to Bendix Brake Company, South Bend, Ind., a corporation of Illinois Application April 8, 1929, Serial No. 353,281

14 Claims. (Cl. 188—72)

This invention relates to brakes wherein non-rotating and rotating friction elements are brought into contact by mechanism operable by fluid under pressure and to associated brake and wheel structure.

An object of this invention is to provide a structure wherein the friction elements are enclosed within a housing capable of retaining a uniform medium for lubrication between the surfaces of the friction elements and capable of excluding dirt and water even though the entire mechanism be immersed therein.

Another object is to provide mechanism which will give a substantially uniform braking action during the entire life of the friction elements without requiring adjustment and which will maintain suitable spaced relation between the rotating and non-rotating friction elements when no braking action is desired.

Certain meritorious features reside in the provision of a rotatable brake drum surrounding the non-rotative wheel spindle and enclosing axially movable, axially spaced apart brake friction discs, a pair of flexible axially spaced apart diaphragms arranged between said discs and responsive to fluid pressure therebetween to expand and urge the discs into frictional engagement with the inner surfaces of the end walls of the drum to retard its rotation, and to associated operating, supporting and other means cooperating therewith.

More specific objects will become apparent as the invention is described in detail and reference is made to the drawings showing my improved brake embodied in the front and rear wheels of an automotive vehicle.

In the drawings,—

Fig. 1 is a horizontal axial section through mechanism embodying my improved brake as applied to an automotive rear wheel and axle mounting of the full floating type.

Figs. 2 and 3 are transverse sections taken at 2—2 and 3—3 of Fig. 1.

Fig. 4 is a horizontal axial section through mechanism embodying my improved brake as applied to an automotive front wheel.

In order to illustrate an adaptation of my improved brake to an automotive vehicle wheel of substantially conventional type with little deviation from standard practice, I employ the much used structure wherein a non-rotatable axle carries spaced apart anti-friction bearings, and a rotatable hub mounted on the outside of the bearings supports the wheel, the deviation from standard practice consisting mainly in enlarging the hub between the bearings to increase the interior surface, then using the extra space thus created for mechanism which may be held against rotation by the non-rotatable spindle and brought into contact with the interior surface of the rotatable hub to retard rotation thereof.

Referring to Fig. 1, the non-rotatable spindle 10 is secured in the end of axle tube 12 which is in turn surrounded by the hub 14 of arm 16, the purpose of which will be hereinafter described. Spindle 10, tube 12 and hub 14 are brazed, riveted, welded or otherwise secured together, and are together non-rotatively secured to the vehicle chassis.

Spindle 10 is of somewhat larger diameter than the conventional type, but is bored out at 18 and 20 to make it lighter. A groove 22 is turned in the outer diameter, but a relatively thick wall is left at 24, and an opening 26 extends lengthwise through this wall and into the groove 22. The outer diameter of spindle 10 carries a plurality of integral keys 28 similar in appearance to gear teeth (see Fig. 2), and the outer end is threaded for nuts 30.

Surrounding spindle 10 are the inner races 32 of the two spaced apart bearings 34 with two washers 36 and a collar 38 between. Washers 36 have integral keys 40 at their inner diameter and a series of somewhat larger keys 42 at the outer diameter. The keys 40 are similar to the teeth of an internal gear and fit into the spaces between keys 28 of spindle 10 (see Fig. 2). The collar 38 is of somewhat greater width than the groove 22 and surrounds the spindle covering the groove. The collar has a series of openings 44 extending radially therethrough (see Fig. 3).

When inner races 32, washers 36 and collar 38 are assembled on spindle 10 and drawn up against shoulder 45 by nuts 30, pressure tight joints are made between the several parts, so that no fluid entering through opening 26 may escape except through openings 44. The races 32, washers 36 and collar 38 are also clamped by nuts 30 against rotative movement, and washers 36 are further held against rotation because of the keys 40 extending into the spaces between keys 28 of the spindle.

At each side of collar 38 is a circular sheet metal diaphragm 46 having circular corrugations 48 in the sides, a plain rim 50 at the outer diameter and a plain rim 52 at the inner diameter. The plain rims 52 extend between the washers 36 and the collar 38 making a pressure joint therebetween, while the plain outer rims 50 are joined to a ring 54 by soldering, welding or other means to make a pressure tight joint therebetween. It is obvious that any fluid entering opening 26 will be confined to the groove 22, the holes 44 and the space 56 between diaphragms 46.

As non-rotating friction elements two discs 58 having integral keys 60 at their inner diameters have free axial movement over the outer diameter of washers 36, the keys 60 of the discs fitting freely into the spaces between keys 42 of the washers.

A plurality of tension springs 62 hooked over pins 64 driven into holes in the edge of discs 58 keep them drawn together in contact with diaphragms 46. A facing 66 of suitable brake lining material may be secured to disc 58 preferably by molding it in place. The diaphragms are not secured to the friction discs but are floatingly mounted between the discs. In this manner the diaphragms are free to conform to irregularities in brake application which are likely to be produced after considerable wear has taken place.

The enlarged hub 68 which surrounds the non-rotating elements consists of two main parts 70 and 72 held together by screws 74. The inner diameters of hub parts 70 and 72 are bored at 76 and 78 to fit snugly over the outer races 80 of bearings 34. One race 80 is held against a shoulder 82 of hub part 72 by a nut 84 and a lock nut 86, while the other race has free axial movement in the bore 76 of hub part 70 which permits a difference in the amount of axial expansion in the spindle and the hub. Cut away parts of nut 84 and lock nut 86 form a groove for felt washer 88.

The relatively thick outer flange 90 of hub part 70 carries studs 92 and nuts 94 whereby disc wheel 96 is held to the hub. The live axle 98 has an integral clutch plate 100 which has clutch teeth engaging corresponding clutch teeth in the flange 90 of hub part 70 to drive the hub substantially as in standard practice. A hub cap 102 completes the enclosure.

To operate the brake a fluid under pressure is admitted through opening 26 into groove 22 and outwardly through openings 44 into the space 56 between the two diaphragms 46. Because of the corrugations 48 the space between the diaphragms is readily increased whereby non-rotatable discs 58 are moved axially outward pressing their facings 66 against the rotatable surfaces 104 of hub parts 70 and 72 thereby retarding rotation thereof.

When the pressure on the operating fluid is relieved springs 62 draw discs 58 together and force the fluid from space 56 thus leaving suitable spaces 106 between surfaces 104 and facings 66 so that no dragging action results when no retarding force is required.

Diaphragms 46 are sufficiently flexible to permit much more expansion than is required to close spaces 106 so that as facings 66 wear away and spaces 106 increase in width it is necessary only that the space 56 between the diaphragms be increased. By providing control means to properly restrict discharge of fluid from space 56 when the brakes are to be relieved, the spaces 106 may be kept uniform regardless of wear. This feature is highly important because ordinary brakes have more or less inaccessible adjusting means which are more or less difficult to maintain in exact adjustment since a wearing away of the friction elements varies the braking effect.

The fully enclosed feature is also highly important since ordinary brakes vary in their braking effect depending upon whether dirt, water or oil is at the moment between the friction elements. Entire uniformity of action is inherent in my improved brake since the lubricant required for the bearings also lubricates the friction surfaces. The materials for the friction surfaces may then be selected to operate with a known degree of lubrication.

Where a mechanically operable emergency or parking brake is required it may be had by supporting an external band 108 on a stud 110 held by arm 16, mechanism (not known) being provided to contract the band against the outer diameter of hub 68 in the usual manner. Where this arrangement is considered objectionable a transmission parking brake may be used instead.

Fig. 4 shows how the same mechanism shown in Figs. 1 to 3 may be adapted to the front or swiveling wheel of a vehicle. In Fig. 4 a solid spindle 112 has the knuckle 114 and steering pin passage 116. The fluid admission opening 118 extends diagonally through the spindle to reach the fluid distributing groove 120. By this construction a relatively smaller spindle and consequently relatively smaller bearings 122 may be employed. Inasmuch as parking brakes are not usually applied to the front wheels, Fig. 4 shows no provision therefor.

While I have shown an embodiment of my improved brake in a full floating rear axle and a modification thereof in a front or swivel wheel, it is obvious that further modifications may be made to apply it to other purposes. For example the removal of drive shaft 98 and of the parking brake parts 14, 16, 108 and 110 makes the brake mechanism shown in Fig. 1 particularly applicable to trailers where the design of a control involving mechanical connections to the brakes is difficult of attainment. And while I have illustrated a structure having two non-rotating surfaces adapted to coact with two rotating surfaces to retard movement of the wheel it is obvious that the number of frictional surfaces in engagement may be increased, if desired, by employing a structure similar to a multiple disc clutch.

I claim:

1. Braking mechanism comprising, in combination, a non-rotative shaft, a diaphragm assembly including a pair of diaphragms joined at their inner and outer peripheries against fluid leakage surrounding the shaft and held against rotation thereon, an axially slidable friction element adjacent each diaphragm on the shaft and held against rotation thereby, a pair of axially immovable friction elements having rotative bearing on the shaft adjacent the axially movable elements, said shaft having a fluid passageway extending thereinto interiorly of said inner rotatable bearing thereon and terminating in an annular channel interiorly of said diaphragm assembly and opening thereinto through a plurality of radial passageways.

2. Braking mechanism comprising, in combination, a non-rotative shaft, a relatively large hollow hub having axially spaced rotative bearings about the shaft, a hollow expansible diaphragm element surrounding the shaft within the hub, an axially slidable friction element held on the shaft against rotation between each end of the hub and the diaphragm element, said shaft having a fluid passageway extending thereinto interiorly of said inner rotative bearing thereabout terminating in a circumferential channel about the shaft, said diaphragm element seated over said channel and provided with a plurality of fluid inlets exposed thereto.

3. Braking mechanism comprising, in combination, a non-rotative shaft, a relatively large hollow hub having axially spaced end rotative bearings about the shaft, a hollow expansible diaphragm element surrounding the shaft within the hub having an inner periphery about the shaft provided with a radial fluid inlet, an axially slidable friction element held on the shaft against rotation between each end of the hub and the diaphragm, and said shaft having means including a fluid passageway extending axially into the shaft interiorly of the rotative bearing thereabout and terminating at said radial fluid inlet of the diaphragm element for admitting fluid under pressure radially into the diaphragm element to expand it to urge said non-rotative friction elements axially against the end walls of the hub to retard its rotation, and resilient contracting means constraining said axially movable friction elements to return to their normal position when the fluid pressure within the diaphragm element is relieved.

4. Braking mechanism comprising, in combination, a non-rotative spindle, a relatively large hollow hub having a rotative bearing in each end wall on the spindle, said spindle having a fluid passageway entering at a point outside one of the bearings and extending interiorly thereof and terminating at a point between the bearings, and fluid pressure responsive friction means splined to said spindle within the hub enclosing the outlet of said fluid opening.

5. Enclosed automotive vehicle brakes comprising, in combination, a non-rotative spindle, a relatively large enclosed hub having a rotative bearing in each end wall on said spindle, a vehicle wheel supported on the hub, an opening in the spindle entering the spindle at a point outside one of the bearings and coming out at a point between the bearings, a pair of diaphragms concentrically surrounding the spindle between the bearings within the hub, the space between said diaphragms communicating with said opening and having no other outlet, non-rotative axially slidable friction elements between said diaphragms and the end walls of the hub, said elements being responsive to the spreading apart of said diaphragms from pressure therebetween to engage the end walls of the hub to retard said wheel, and a separately operable external contracting friction band on the outside of the hub.

6. Brake mechanism comprising, in combination, a non-rotative spindle, a brake drum rotatably surrounding the spindle, said spindle provided with a fluid opening therethrough terminating within the drum in a channel formed in and encircling the spindle, fluid pressure responsive retarding means arranged within the drum on opposite sides of said channel and opening thereto to be urged outwardly into frictional contact with the end walls of the drum.

7. Brake mechanism comprising, in combination, a non-rotative spindle provided with an annular channel, a pair of bearing surfaces on the spindle arranged upon each side of the channel, a brake drum surrounding the spindle having end walls rotatably mounted on said bearing surfaces arranged on opposite sides of the channel, a fluid pressure responsive frictional disc supported on each bearing surface adjacent to the end wall of the drum and adapted to be integrally urged axially thereagainst, and means constraining said discs away from the end walls of the drum.

8. In combination with a fixed spindle, an annular collar secured thereto, spaced apart radial openings through said collar, an annular diaphragm having the inner circumferences thereof secured to opposite faces respectively of said collar adjacent the periphery thereof, and means for injecting fluid through said radial openings into said diaphragms.

9. In combination with brake mechanism including a pair of axially movable friction discs operable to engage a rotating part to retard rotation thereof, a fluid diaphragm intermediate said discs and operable to force the same into retarding engagement and means for injecting fluid in a radial direction into said diaphragm at spaced apart intervals round its inner circumference.

10. Automotive vehicle braking mechanism comprising, in combination, a non-rotative spindle, a pair of bearings spaced axially along the spindle, a pair of annular plates rotatably supported about the bearings and joined at their peripheries to form a closed chamber, a vehicle wheel carried by said plates to rotate therewith, and non-rotative friction elements in the chamber adapted to be urged against the plates to retard the rotation of the wheel.

11. Automotive vehicle braking mechanism comprising, in combination, a non-rotative spindle, a pair of bearings spaced axially along the spindle, a hollow drum having walls substantially perpendicular to the axis of the spindle and contacting the bearings to be rotatably supported thereby, a vehicle wheel carried by said hollow drum to rotate therewith, and friction elements within the hollow drum adapted to be expanded against the walls of the drum whereby the rotation of the wheel is retarded.

12. Vehicle braking mechanism comprising, in combination, a non-rotative shaft, a hollow drum rotatably supported by bearings on said shaft, a wheel carried by said hollow drum to rotate therewith, friction plates axially slidable but non-rotatively held by said shaft in said hollow drum, an expansible element located between said friction plates, and means extending through said shaft for transmitting fluid pressure from outside of the wheel to the interior of the expansible element within the drum to expand the same and urge the friction plates against the walls of the drum whereby the rotation of the wheel is retarded.

13. Brake mechanism comprising, in combination, a non-rotative spindle, a brake drum rotatably surrounding the spindle, a pair of axially spaced apart friction discs axially slidably supported on the spindle against rotation within the drum and adapted to be urged apart against the end walls of the drum, fluid pressure responsive mechanism secured to said spindle between said discs but unsecured to the discs so as to float therebetween, and means for admitting fluid under pressure to said mechanism to urge the discs into frictional engagement with the end walls of the drum.

14. Brake mechanism comprising, in combination, a non-rotative spindle, a brake drum rotatably surrounding the spindle, a pair of axially spaced apart friction discs axially slidably supported on the spindle against rotation within the drum and adapted to be urged apart against the end walls of the drum, fluid pressure responsive mechanism secured to said spindle between said discs but unsecured to the discs so as to float therebetween, means for admitting fluid under pressure to said mechanism to urge the discs into frictional engagement with the end walls of the drum, and tensioning means connecting the outer peripheries of the discs for yieldingly drawing said discs toward one another.

VINCENT G. APPLE.